M. P. REYNOLDS.
SEED TESTING BED.
APPLICATION FILED JUNE 24, 1913.
1,094,813.
Patented Apr. 28, 1914.
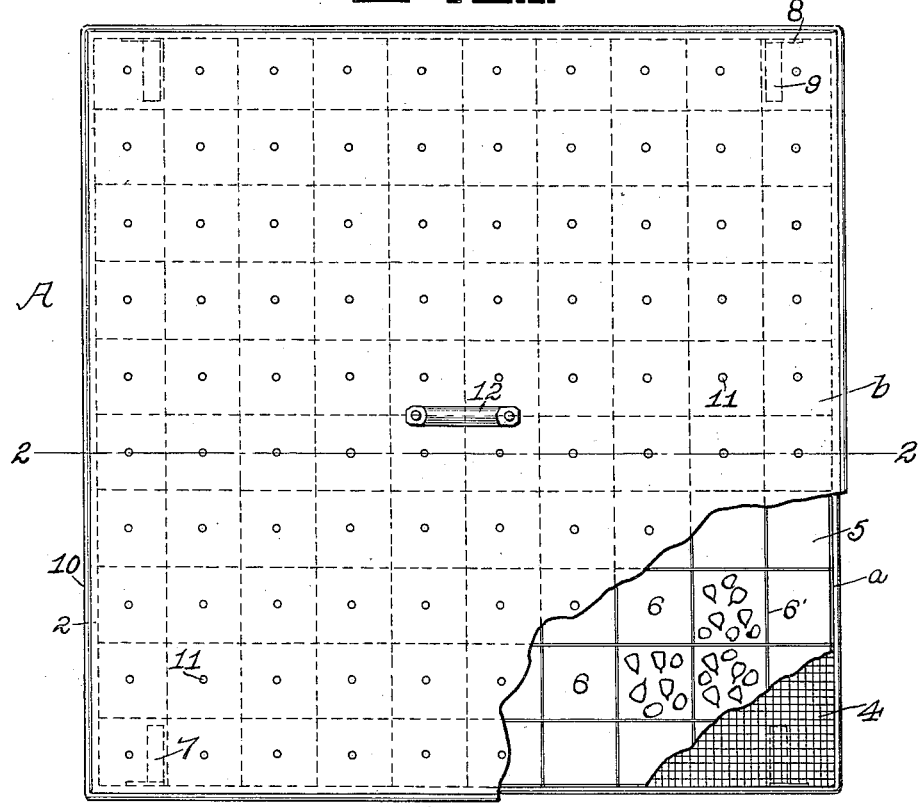
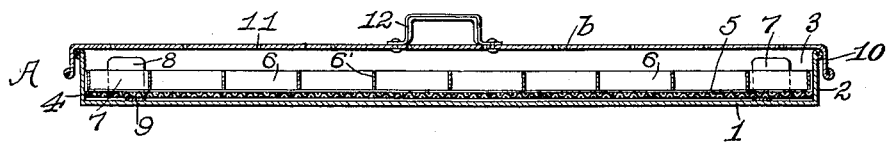
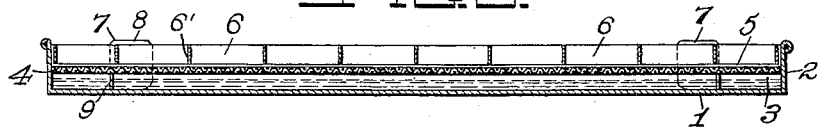
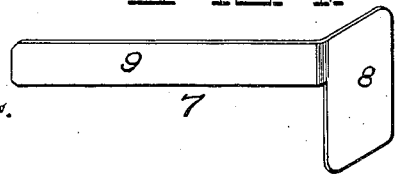
WITNESSES:
J. W. Mayfield
J. B. Humphries
INVENTOR
Morley Punshon Reynolds,
BY J. W. Cooke
ATTORNEY
COLUMBIA PLANOGRAPH CO., WASHINGTON, D. C.

UNITED STATES PATENT OFFICE.

MORLEY P. REYNOLDS, OF CLEVELAND, OHIO.

SEED-TESTING BED.

1,094,813.

Specification of Letters Patent.

Patented Apr. 28, 1914.

Application filed June 24, 1913. Serial No. 775,559.

*To all whom it may concern:*

Be it known that I, MORLEY P. REYNOLDS, a citizen of the United States, and a resident of Cleveland, in the county of Cuyahoga and State of Ohio, have invented a new and useful Improvement in Seed-Testing Beds; and I do hereby declare the following to be a full, clear, and exact description thereof.

My invention relates to seed testing beds or trays and has special reference to such beds or trays for the testing of seeds, such as corn seeds, etc., for germination purposes.

The object of my invention is to provide a cheap, simple and efficient seed testing bed or tray, which can be easily and cheaply manufactured, will enable the seed to be handled easily and conveniently in the germination process, and will enable the device to be handled and operated easily, quickly and conveniently at all times, such as when in use or not in use.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved seed testing bed or tray, I will describe the same more fully, referring to the accompanying drawing, in which:—

Figure 1 is a top plan view of my improved seed testing bed or tray. Fig. 2 is a sectional view of the same on the line 2—2 Fig. 1, showing it in one position. Fig. 3 is a like view of the same showing it in another position. Fig. 4 is a perspective view of one of the levers employed.

Like symbols of reference herein indicate like parts in each of the figures of the drawing.

As illustrated in the drawing A indicates my improved seed testing bed or tray, which comprises the tray $a$ formed of a casing or pan and cover $b$ for fitting over the same, and such tray is formed of square or other shape and provided with a bottom 1 with flanges or sides 2 extending up from the same to form the receptacle 3 therein. Fitting within the receptacle 3 of the tray $a$ is the removable perforated bottom 4 which is preferably formed of wire cloth or fabric of suitable mesh and has a cloth or textile covering 5 of fabric, such as drilling or heavy muslin over the same. Supported by and on the covering 5 and bottom 4 are the seed receptacles or cups 6, which are formed by thin strips 6' of sheet metal, such as galvanized iron, set vertically, and connected together to form such cups in square shape. The side edges of the cloth covering 5 preferably extend up around the sides of the strips forming the seed cups 6 and such covering is secured to the removable bottom 4 in any suitable manner in order to be raised and lowered together and with said seed cups, as hereinafter described.

Around the sides 2 of the tray $a$ and within the receptacle 3 of the same are the levers 7, which are preferably separately and loosely positioned in said tray formed of thin sheet metal, and each is provided with a handle portion 8 and bearing portion 9 extending out at right angles therefrom. The handle portions 8 on these levers 7 are adapted to fit along the tray sides 2 and the bearing portions 9 thereon are adapted to rest against the bottom 1 of the tray $a$.

The cover $b$ is provided with the flanged sides 10 thereon for fitting over the flanged sides 2 on the tray $a$ and within such cover a series of perforations or small holes 11 are formed, one of which is opposite or above each seed cup 6, while a handle 12 is connected to said cover for handling the same.

In the use and operation of my improved seed testing bed A, the removable perforated bottom 4 with its covering 5 and the seed cups 6, are in the position in the receptacle 3 of the tray $a$, as shown in Fig. 2, so that the seeds for germination can then be placed in said cups and a sufficient amount of water placed in such tray as will cover said seeds, after which the cover $b$ can be placed over said tray. After the seeds remain in the water as thus described for a sufficient length of time (about twenty-four (24) hours), the cover $b$ is removed and then the bottom 4 with its cover 5, the seed cups 6 and seeds therein are raised up within the receptacle 3 of the tray $a$, so as to clear said seeds from the water, as shown in Fig. 3, by means of the levers 7 and by moving or pressing the handles 8 on said levers to one side, which will throw the bearing portions 9 on said levers in a vertical line and thus raise said parts and seeds by the edges on said bearing portions engaging the bottom 1 of the tray and bottom surface of the bottom 5, thereby supporting said raised parts and seed above the water, as shown in said figure. After this is done, the cover b is then replaced on the tray a and the water remaining in the tray will supply the necessary moisture for the best germination, in allowing such moisture to be taken up from the water by means of the perforations 11 in said cover, so that there will be practically no tendency for the seeds to mold.

It will thus be seen that my improved seed testing bed can be used with any device for holding the ears of corn from which seeds are to be tested, and that the best possible results of germination can be obtained therefrom, while the bed is compact and handy in form and when in use, can be used and operated by any unskilled person.

Various modifications and changes in the design and construction of my improved seed testing bed may be resorted to without departing from the spirit of the invention or sacrificing any of its advantages.

What I claim as my invention and desire to secure by Letters Patent is:—

1. A seed testing bed comprising a casing for containing water, a series of seed receptacles in said casing, means for raising said receptacles to position the seeds therein above the water, and means whereby the casing may be inclosed to conserve moisture therein after the seed receptacles are raised.

2. A seed testing bed comprising a casing for containing water, a series of seed receptacles in said casing, means for raising said receptacles to position the seeds therein above the water, and perforated means whereby the casing may be inclosed to conserve moisture therein after the seed receptacles are raised.

3. A seed testing bed comprising a casing for containing water, a series of seed receptacles in said casing having a perforated bottom thereon, means for raising said receptacles to position the seeds therein and said bottom above the water, and means whereby the casing may be inclosed to conserve moisture therein after the seed receptacles are raised.

4. A seed testing bed comprising a casing for containing water, a series of seed receptacles in said casing having a perforated bottom thereon, means for raising said receptacles to position the seeds therein and said bottom above the water, and perforated means whereby the casing may be inclosed to conserve moisture therein after the seed receptacles are raised.

5. A seed testing bed comprising a casing for containing water, a series of seed receptacles in said casing having a perforated bottom, a textile covering over said bottom, means for raising said receptacles to position the seeds therein and said bottom and covering above the water, and means whereby the casing may be inclosed to conserve the moisture therein after the seed receptacles are raised.

6. A seed testing bed comprising a casing for containing water, a series of seed receptacles in said casing having a perforated bottom, a textile covering over said bottom, means for raising said receptacles to position the seeds therein and said bottom and covering above the water, and perforated means whereby the casing may be inclosed to conserve the moisture therein after the seed receptacles are raised.

7. A seed testing bed comprising a casing for containing water, a series of seed receptacles in said casing, levers within said casing for raising said receptacles to position the seeds therein above the water, and means whereby the casing may be inclosed to conserve moisture therein after the seed receptacles are raised.

8. A seed testing bed comprising a casing for containing water, a series of seed receptacles in said casing, levers within said casing for raising said receptacles to position the seeds therein above the water, and perforated means whereby the casing may be inclosed to conserve moisture therein after the seed receptacles are raised.

9. A seed testing bed comprising a casing for containing water, a series of seed receptacles in said casing having a perforated bottom thereon, levers within said casing for raising said receptacles to position the seeds therein and said bottom above the water, and means whereby the casing may be inclosed to conserve moisture therein after the seed receptacles are raised.

10. A seed testing bed comprising a casing for containing water, a series of seed receptacles in said casing having a perforated bottom thereon, levers within said casing for raising said receptacles to position the seeds therein and said bottom above the water, and perforated means whereby the casing may be inclosed to conserve moisture therein after the seed receptacles are raised.

11. A seed testing bed comprising a casing for containing water, a series of seed receptacles in said casing having a perforated bottom, a textile covering over said bottom, levers within said casing for raising said receptacles to position the seeds therein and said bottom and covering above the water, and means whereby the casing may be inclosed to conserve the moisture therein after the seed receptacles are raised.

12. A seed testing bed comprising a casing for containing water, a series of seed receptacles in said casing having a perforated bottom, a textile covering over said bottom, levers within said casing for raising said receptacles to position the seeds therein and said bottom and covering above the water, and perforated means whereby the casing may be inclosed to conserve the moisture therein after the seed receptacles are raised.

In testimony whereof, I the said MORLEY P. REYNOLDS, have hereunto set my hand.

MORLEY P. REYNOLDS.

Witnesses:
E. P. DISBRO,
SADIE PAUL.

Copies of this patent may be obtained for five cents each, by addressing the "Commissioner of Patents, Washington, D. C."